(12) United States Patent
Iwata et al.

(10) Patent No.: US 10,041,537 B2
(45) Date of Patent: Aug. 7, 2018

(54) SLIDE MEMBER FOR SHOCK ABSORBER OF VEHICLE

(71) Applicant: DAIDO METAL COMPANY LTD., Nagoya (JP)

(72) Inventors: Hideki Iwata, Inuyama (JP); Yoshifumi Ito, Inuyama (JP)

(73) Assignee: Daido Metal Company Ltd., Nagoya (JP)

( * ) Notice: Subject to any disclaimer, the term of this patent is extended or adjusted under 35 U.S.C. 154(b) by 0 days.

(21) Appl. No.: 15/070,171

(22) Filed: Mar. 15, 2016

(65) Prior Publication Data
US 2016/0273583 A1    Sep. 22, 2016

(30) Foreign Application Priority Data
Mar. 16, 2015  (JP) .................... 2015-052091

(51) Int. Cl.
*F16C 33/12*    (2006.01)
*F16C 33/20*    (2006.01)
(Continued)

(52) U.S. Cl.
CPC ............ *F16C 33/128* (2013.01); *F16C 29/02* (2013.01); *F16C 33/201* (2013.01);
(Continued)

(58) Field of Classification Search
CPC ...... F16C 33/20; F16C 33/201; F16C 33/203; F16C 33/205; F16C 2208/32;
(Continued)

(56) References Cited

U.S. PATENT DOCUMENTS 4,123,122 A  * 10/1978  Gabrielson ........... F16C 23/045
                                                            384/300
8,012,569 B2 *  9/2011  Ochi ....................... C23C 24/06
                                                            384/322
(Continued)

FOREIGN PATENT DOCUMENTS

EP          0384711          8/1990
EP          0590488          4/1994
(Continued)

OTHER PUBLICATIONS

Extended European Search Report dated Sep. 5, 2016 in corresponding EP Application No. 16158705.0.

*Primary Examiner* — Alan B Waits
(74) *Attorney, Agent, or Firm* — Snyder, Clark, Lesch & Chung, LLP

(57) ABSTRACT

According to the present invention, there is provided a slide member for a shock absorber of a vehicle including a back metal, a porous sintered metal layer containing a porous sintered metal formed on the back metal and a resin with which the porous sintered metal is impregnated and covered, and a resin slide layer formed on the porous sintered metal layer and having a smooth slide surface, and the slide member is formed in a cylindrical shape so that the resin slide layer is disposed on an inner peripheral side. The resin slide layer is composed of polytetrafluoroethylene and a plurality of granular elements dispersed in the polytetrafluoroethylene, and the granular element is composed of molybdenum disulfide and molybdenum trioxide, and/or tungsten disulfide and tungsten trioxide.

14 Claims, 2 Drawing Sheets

Figure 1:
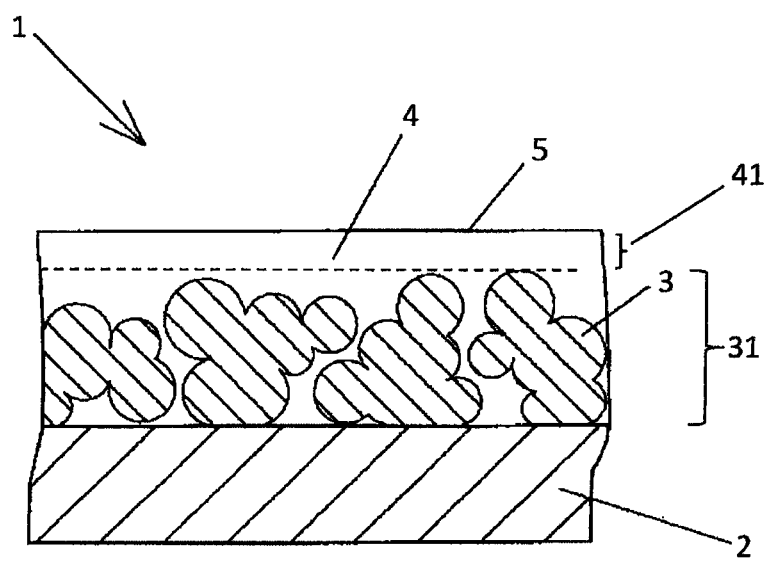

(51) Int. Cl.
*F16C 29/02* (2006.01)
*F16F 9/36* (2006.01)

(52) U.S. Cl.
CPC .............. *F16C 33/206* (2013.01); *F16F 9/36* (2013.01); *F16C 2202/54* (2013.01); *F16C 2208/02* (2013.01); *F16C 2208/32* (2013.01); *F16C 2240/48* (2013.01); *F16C 2240/54* (2013.01); *F16F 2226/026* (2013.01)

(58) Field of Classification Search
CPC .. F16C 2202/54; F16C 29/02; F16C 2240/48; F16C 2240/54; F16C 2208/02; F16C 33/128; F16C 33/206; F16F 9/36; F16F 2226/026
See application file for complete search history.

(56) References Cited

U.S. PATENT DOCUMENTS

| | | |
|---|---|---|
| 2005/0180669 A1 | 8/2005 | Kagohara |
| 2007/0031651 A1 | 2/2007 | Kagohara |
| 2007/0231564 A1 | 10/2007 | Ochi |
| 2014/0064641 A1 | 3/2014 | Kurata et al. |

FOREIGN PATENT DOCUMENTS

| | | |
|---|---|---|
| JP | 2003-247546 | 9/2003 |
| JP | B2-5354134 | 9/2013 |

* cited by examiner

SLIDE MEMBER FOR SHOCK ABSORBER OF VEHICLE

CROSS-REFERENCE TO RELATED APPLICATION

This application is based on and claims the benefit of priority from Japanese Patent Application No. 2015-052091 filed on Mar. 16, 2015. The entire disclosure of the above application is incorporated herein by reference.

BACKGROUND OF THE INVENTION (1) Field of the Invention

The present invention relates to a slide member formed in a cylindrical shape for a shock absorber provided between a vehicle body and a wheel of a vehicle for supporting a piston rod reciprocally sliding in an axial direction in a shock absorber.

(2) Description of Related Art

In order to enhance ride quality such as steering stability and running stability, a shock absorber is provided between each wheel and a vehicle body in, e.g., a vehicle as typified by automobiles. A common multi-cylinder shock absorber is used to relieve and damp a rocking phenomenon (periodic vibration) of expansion and contraction due to spring characteristics so that, in the contraction action, damping force (pressure loss) is generated by channel resistance when the same amount of oil as the volume of a piston rod entering a cylinder passes through a contraction-side valve while, in the extension action, the damping force is generated by the channel resistance when the same amount of oil as the volume of the piston rod coming out of the cylinder passes through an extension-side valve. For such a shock absorber, a slide member configured to reciprocally slide on the piston rod coupled to a vehicle body is used, and a surface roughness of a slide surface of the slide member is reduced as much as possible to reduce friction force generated between the piston rod and the slide surface of the slide member (see JP-A-2003-247546, for example).

Further, as another conventional shock absorber, there is proposed a shock absorber in which convex portions each having a point peak or a linear peak are formed on a slide surface of a slide member to inhibit formation of an oil film on the slide surface and thus increase dynamical friction force generated between a piston rod and the slide surface of the slide member (see JP-B2-5354134).

BRIEF SUMMARY OF THE INVENTION

Meanwhile, in the case of using the slide member with the slide surface whose friction is merely reduced as in the art disclosed in JP-A-2003-247546, the slide member is advantageous when the vehicle runs on a smooth road surface in that the shock absorber can easily repeat extension and contraction because vibration transmitted from the road surface to the vehicle body is small, and the piston rod easily slides as the friction force between the slide member and the piston rod is smaller, so that the piston rod can smoothly move in and out of the cylinder, thereby easily generating damping force. On the other hand, when the vehicle runs on a bumpy road surface, the vibration transmitted from the road surface to the vehicle body becomes large, and the piston rod slides too much and deeply enters in the cylinder in the contraction action as the friction force between the slide member and the piston rod is small, so that the vehicle body tilts greatly, and the ride quality of the vehicle is worsened.

Further, in the case where the convex portions each having the point peak or the linear peak are formed on the slide surface of the slide member to inhibit the formation of the oil film on the slide surface and thus increase the dynamical friction force between the slide surface and the piston rod as in the art disclosed in JP-B2-5354134, when the vehicle runs on a smooth road surface, the piston rod does not smoothly move in and out of the cylinder and it becomes difficult to repeat extension and contraction, so that the ride quality of the vehicle is worsened. Furthermore, in the case of this conventional slide member, the peaks of the convex portions provided on the slide surface of the slide member wear while the shock absorber is used, and therefore the function of inhibiting the oil film is gradually lost, resulting in change in ride quality.

Accordingly, the present invention has been made in view of the foregoing circumstances, and thus an object thereof is to provide a slide member for a shock absorber of a vehicle in which friction force is generated between the slide member and a piston rod promptly in accordance with the state of a road surface in both extension and contraction actions of the shock absorber to improve running stability and to maintain the running stability for a long period of time.

In order to achieve the above object, the present invention provides a slide member for a shock absorber provided between a vehicle body and a wheel of a vehicle for supporting a piston rod reciprocally sliding in an axial direction in the shock absorber, which slide member includes: a back metal; a porous sintered metal layer containing a porous sintered metal formed on the back metal and a resin by which the porous sintered metal is impregnated and covered; and a resin slide layer formed on the porous sintered metal layer and having a smooth slide surface. The slide member is formed in a cylindrical shape so that the resin slide layer is disposed on an inner peripheral side, the resin slide layer is composed of polytetrafluoroethylene and a plurality of granular elements dispersed in the polytetrafluoroethylene, and the granular elements are composed of molybdenum disulfide and molybdenum trioxide, and/or tungsten disulfide and tungsten trioxide.

In the above-described slide member, a surface roughness of the slide surface of the resin slide layer is preferably equal to or less than 5 μm in ten-point average roughness (Rz). Note that the ten-point average roughness (Rz) is a surface roughness parameter obtained in accordance with German industrial standards "DIN 4776".

In the above-described slide member, an average particle diameter of the plurality of granular elements is preferably 5 to 25 μm, and a content amount of the plurality of granular elements in the resin slide layer is preferably 5 to 30 vol. %.

A content amount of the molybdenum trioxide and/or the tungsten trioxide in the granular elements is preferably 20 to 50 vol. % in total (in other words, the ratio between the sulfide and the oxide contained in the granular elements is 8:2 to 5:5). The ratio of the content amounts may be an average of all granular elements, in view of variation in manufacturing.

In the above-described slide member, the resin slide layer preferably further contains carbon and/or graphite of more than 0 vol. % but equal to or less than 5 vol. % in total.

According to the slide member for the shock absorber of the vehicle of the present invention, since the resin slide layer includes the granular elements (oxide sulfide) composed of molybdenum disulfide and molybdenum trioxide, and/or tungsten disulfide and tungsten trioxide, the friction force between the piston rod and the slide surface of the resin slide layer is low when the load applied from the piston rod to the slide surface of the resin slide layer is low, and the friction force between the piston rod and the slide surface of the resin slide layer increases when the load applied to the slide surface of the resin slide layer is high. Thus, the slide member of the present invention promptly generates friction force between the slide member and the piston rod in accordance with the state of the road surface in the respective extension and contraction actions of the shock absorber, so that the running stability is improved. Further, since the slide surface of the resin slide layer is smooth in this slide member, the running stability is maintained for a long period of time.

BRIEF DESCRIPTION OF THE SEVERAL VIEWS OF THE DRAWING(S)

Figure 2:
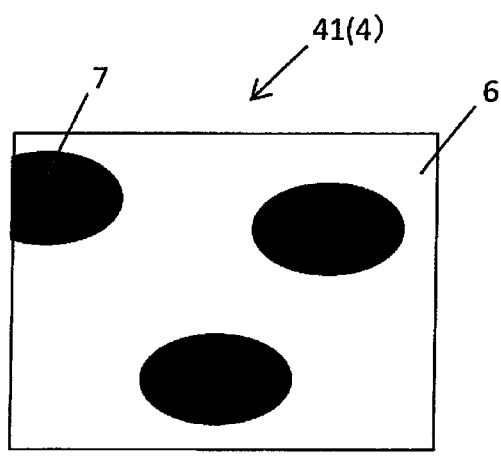
Figure 3:
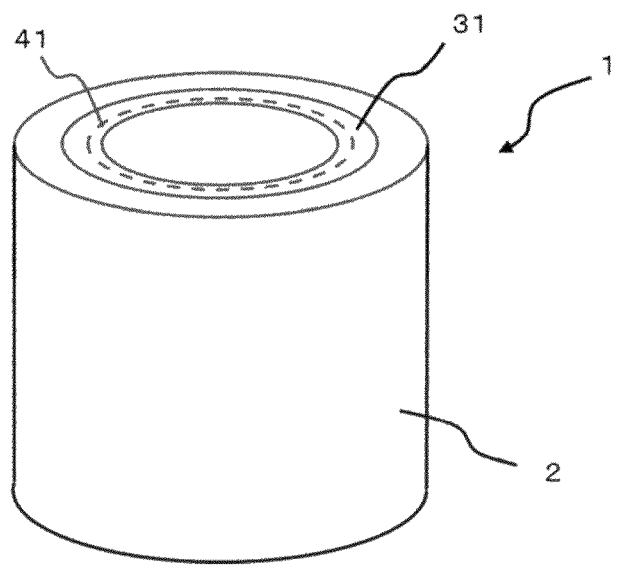

FIG. 1 is a cross-sectional view showing the structure of a slide member 1 of an embodiment of the present invention;
FIG. 2 is a cross-sectional view showing the structure of a resin slide layer 41 of the slide member 1 in FIG. 1; and
FIG. 3 is a perspective view of the slide member of FIG. 1.

DETAILED DESCRIPTION OF THE INVENTION

FIG. 1 illustrates a cross-sectional structure of a slide member 1 of an embodiment of the present invention. The slide member 1 is used for a shock absorber provided between a vehicle body and each wheel of a vehicle, and supports a piston rod reciprocally sliding in an axial direction in the shock absorber. The slide member 1 is formed by: impregnating and covering a porous sintered metal 3 formed on a back metal 2 with a resin 4 to form a porous sintered metal layer 31 and a resin slide layer 41, and then forming the slide member 1 in a cylindrical shape (see FIG. 3, for example) such that the resin slide layer 41 is disposed on an inner circumferential side.

For example, steel, stainless steel, copper, and a copper alloy can be used as the back metal 2. Further, copper powder or an alloy of copper such as bronze can be used as the porous sintered metal 3, for example.

The resin 4 permeates into and covers pores and a surface of the porous sintered metal 3 formed on the back metal 2, thereby forming the porous sintered metal layer 31 and the resin slide layer 41. The thickness of the resin slide layer 41 on the surface of the porous sintered metal layer 31 is about 10 to 40 µm, and the porous sintered metal 3 is not exposed on a slide surface 5 which is the surface of the resin slide layer 41. Moreover, the slide surface 5 of the resin slide layer 41 is formed smoothly. Specifically, the smooth slide surface 5 of the resin slide layer 41 means the surface having a ten-point average roughness (Rz) of equal to or less than 15 µm.

The resin slide layer 41 is formed on the surface of the porous sintered metal layer 31. The porous sintered metal layer 31 is a layer formed by the porous sintered metal 3 and the resin 4 permeating the pores of the porous sintered metal 3. The surface of the porous sintered metal layer 31 is defined as a virtual plane passing through the uppermost portion of the porous sintered metal 3 (i.e., the position of the porous sintered metal 3 closest to the slide surface 5 in the direction perpendicular to the slide surface 5 of the resin slide layer 41) and being parallel to the slide surface 5 of the resin slide layer 41 as viewed in the cross section perpendicular to the slide surface 5 of the resin slide layer 41 of the slide member 1.

The resin slide layer 41 is a layer formed by the resin 4 on the surface of the porous sintered metal layer 31. The resin 4 of the resin slide layer 41 includes at least polytetrafluoroethylene (hereinafter referred to as "PTFE") 6 and a plurality of granular elements 7 dispersing in the polytetrafluoroethylene 6. That is, the resin 4 has such a structure that the plurality of granular elements 7 disperse in the PTFE 6 which is used as a base, as illustrated in FIG. 2. Note that a portion of the resin 4 other than the resin slide layer 41, i.e., the resin 4 in the porous sintered metal layer 31 does not directly relate to sliding of the slide member 1, and therefore the content of the granular elements 7 in the resin 4 of the porous sintered metal layer 31 may be less than that in the resin 4 of the resin slide layer 41 and the resin 4 of the porous sintered metal layer 31 may contain molybdenum disulfide or tungsten disulfide which is a raw material of the granular elements 7 as described later, for example.

The average particle diameter of the granular elements 7 may be 2 to 30 µm, and is preferably 5 to 25 µm. The average particle diameter of the granular elements 7 is defined by: taking an electron image of the resin slide layer 41 with 500 magnifications in the cross-sectional structure parallel to the thickness direction of the slide member 1 using an electronic microscope; analyzing the acquired image using a common analysis technique (e.g., an analysis software named "Image-Pro Plus (Version 4.5)" manufactured by Planetron, Inc.); calculating an equivalent circle diameter based on the area of each granular element 7, and then averaging the equivalent circle diameters as a particle diameter. As will be described later, the average particle diameter of the granular elements 7 relates to the volume ratio of molybdenum trioxide or tungsten trioxide contained in the granular element. The content amount of the granular elements 7 in the resin 4 of the resin slide layer 41 is preferably 5 to 30 vol. %.

The granular elements 7 may be composed of molybdenum disulfide and molybdenum trioxide, tungsten disulfide and tungsten trioxide, or molybdenum disulfide, molybdenum trioxide, tungsten disulfide and tungsten trioxide (in other words, composed both of the one composed of molybdenum disulfide and molybdenum trioxide, and the one composed of tungsten disulfide and tungsten trioxide), which can be confirmed by measurement using the X-ray electron spectroscopy.

The content amount of molybdenum trioxide, tungsten trioxide, or a combination of molybdenum trioxide and tungsten trioxide in the granular elements 7 is preferably 20 to 50 vol. % in total.

Note that the content amount of these oxides can be calculated by the ratio between the area of a narrow peak of an electron spectrum showing a binding energy of molybdenum disulfide and the area of a narrow peak of an electron spectrum showing a binding energy of molybdenum trioxide that are measured by the X-ray electron spectroscopy using the resin slide layer 41 as a sample, or by the ratio between the area of a narrow peak of an electron spectrum showing a binding energy of tungsten disulfide and the area of a narrow peak of an electron spectrum showing a binding energy of tungsten trioxide.

The granular elements 7 are made from the powder of molybdenum disulfide and/or tungsten disulfide as a raw material. The crystal structures of the molybdenum disulfide and the tungsten disulfide are a hexagonal crystal, and the entire structure is a laminated structure (configuration) in which layers of two-dimensional crystal overlap with each other. The layers are bound weakly with van der Waals' force, and therefore slide against each other, when receiving a load, so that the coefficient of friction decreases.

The granular elements 7 are obtained by controlling oxidation so that, while the laminated structure of molybdenum disulfide or tungsten disulfide which is a raw material remains, a layer of molybdenum trioxide or tungsten trioxide is formed in places between the layers of molybdenum disulfide or tungsten disulfide. More specifically, it is deemed that a part of the laminated structure in which layers of two-dimensional crystal of molybdenum disulfide or tungsten disulfide before oxidation overlap with each other is subjected to the controlled oxidation treatment so that sulfur atoms are replaced with oxygen atoms, and therefore is changed to a laminated structure in which the layer of two-dimensional crystal of molybdenum disulfide and the layer of crystal of molybdenum trioxide overlap with each other, or to a laminated structure in which the layer of two-dimensional crystal of tungsten disulfide and the layer of crystal of tungsten trioxide overlap with each other.

Next, the oxidation treatment for making the granular elements 7 will be described. First, pores and a surface of a porous sintered metal 3 previously prepared by sintering a porous metal on a back metal 2 are impregnated and covered with a mixed liquor obtained by mixing of molybdenum disulfide and/or tungsten disulfide with PTFE in an organic solvent. Subsequently, the solvent is heated and dried for 0.2 hour at 80 to 150° C. in a heating furnace having an active atmosphere with an oxygen concentration of 25%, and then is heated for 0.5 hour at 350 to 450° C. to carry out the oxidation treatment so that the molybdenum disulfide or the tungsten disulfide is partially oxidized while the PTFE is baked, resulting in a resin slide layer 41 composed of the PTFE 6 and the granular elements 7. Further, it is necessary that the atmosphere gas is allowed to be fluidized in the heating furnace, and the velocity of the atmosphere gas on the surface (slide surface 5) side of the slide member 1 is equal to or higher than 2.5 m/second (i.e., fresh active atmosphere gas needs to be flown). Hydrogen sulfide gas may be generated in the course of the oxidation process of molybdenum disulfide or tungsten disulfide, however, if hydrogen sulfide gas remains drifting around the molybdenum disulfide or tungsten disulfide (or remains covering the molybdenum disulfide or tungsten disulfide), molybdenum trioxide or tungsten trioxide is inhibited from generating in the molybdenum disulfide or tungsten disulfide as the raw material. By making the velocity of the active atmosphere gas equal to or higher than 2.5 m/second on the surface (slide surface 5) side of the slide member 1, the hydrogen sulfide gas circulates, and an oxygen component in the active atmosphere is supplied to the surrounding of the molybdenum disulfide or tungsten disulfide, so that a suitable amount of molybdenum trioxide or tungsten trioxide is formed in the granular elements 7.

Not only the above described treatment conditions but also the particle diameter of molybdenum disulfide or tungsten disulfide used as the raw material relate to formation of the granular elements 7. The average particle diameter is preferably 2 to 30 μm, and more preferably 5 to 20 μm. Note that the particle diameter of the granular element 7 is substantially the same as that of molybdenum disulfide or tungsten disulfide used as the raw material. In the case where the average particle diameter of molybdenum disulfide or tungsten disulfide used as the raw material is less than 2 μm, the specific surface area of particles is large, and therefore oxidation in the oxidation treatment is easily promoted, so that the ratio of the oxide in the granular element becomes large. As a result, friction force tends to increase under the conditions where the load applied to the surface (slide surface 5) of the resin slide layer 41 is low. In the case where the average particle diameter of molybdenum disulfide or tungsten disulfide used as the raw material exceeds 30 μm, the specific surface area of particles is small, and therefore oxidation is easily suppressed, so that the ratio of molybdenum trioxide or tungsten trioxide in the granular elements 7 after the oxidation treatment becomes small. As a result, the friction force tends to decrease under the conditions where the load applied to the surface (slide surface 5) of the resin slide layer 41 is high.

Note that the resin slide layer 41 of the slide member 1 may further contain, as a filler, one or more selected from the group consisting of graphite and carbon within a range of greater than 0 vol. % and equal to or less than 5 vol. %.

(Advantageous Effects)

According to the present invention, because the resin slide layer 41 of the slide member 1 contains the granular elements 7, in the case where the load applied to the slide surface 5 of the resin slide layer 41 is low, slippage mainly occurs only between the layers of two-dimensional crystal of molybdenum disulfide or between the layers of two-dimensional crystal of tungsten disulfide in the granular elements 7, but no slippage occurs between the layer of two-dimensional crystal of molybdenum disulfide and the layer of crystal of molybdenum trioxide or between the layer of two-dimensional crystal of tungsten disulfide and the layer of crystal of tungsten trioxide. Therefore, low friction force is maintained between the slide surface 5 of the resin slide layer 41 of the slide member 1 and the piston rod. On the other hand, in the case where the load applied to the slide surface 5 of the resin slide layer 41 of the slide member 1 is high, slippage occur not only between the layers of two-dimensional crystal of molybdenum disulfide or between the layers of two-dimensional crystal of tungsten disulfide in the granular elements 7, but also between the layer of two-dimensional crystal of molybdenum disulfide and the layer of crystal of molybdenum trioxide or between the layer of two-dimensional crystal of tungsten disulfide and the layer of crystal of tungsten trioxide. Since binding between the layer of two-dimensional crystal of molybdenum disulfide and the layer of crystal of molybdenum trioxide or between the layer of two-dimensional crystal of tungsten disulfide and the layer of crystal of tungsten trioxide is stronger than that between the layers of two-dimensional crystal of molybdenum disulfide or between the layers of two-dimensional crystal of tungsten disulfide, the friction force between the slide surface 5 of the resin slide layer 41 and the piston rod increases by the amount of the force (or the task) required for causing the slippage between the above-described layers.

Moreover, since the slide surface 5 of the resin slide layer 41 is smooth in the slide member 1 of the present invention, even if the slide surface 5 of the resin slide layer 41 wears, the granular element(s) 7 is constantly exposed on the slide surface 5 of the resin slide layer 41, and therefore the above-described characteristics are maintained for a long period of time.

The inventor has confirmed characteristics also in the case where a resin slide layer has a composition of PTFE, granular molybdenum disulfide and granular molybdenum trioxide, and the case where a resin slide layer has a composition of PTFE, granular tungsten disulfide and granular tungsten trioxide unlike the embodiment of the present invention, however, the above-described characteristics as in the present invention cannot be obtained. That is, in the case where the load applied to the resin slide layer is low, the friction force against the piston rod becomes high excessively due to the influence of the molybdenum trioxide or tungsten trioxide dispersing in the resin slide layer while, in the case where the load applied to the resin slide layer is high, the friction force against the piston rod becomes low excessively due to the influence of the molybdenum disulfide or tungsten disulfide dispersing in the resin slide layer (see comparative example 3 below, for example).

Hereinafter, the relationship between the characteristics of the resin slide layer 41 of the slide member 1 and the ride quality of the vehicle will be described.

The shock absorber has such a well-known hydraulic configuration that a piston having an orifice is arranged in a cylinder. The cylinder is attached to a wheel side, whereas the piston rod is attached to a vehicle side. In general, the shock absorber is disposed such that an axis thereof inclines relative to a reciprocation direction of the wheels and the vehicle body, and therefore the resin slide layer 41 of the slide member 1 is partially in contact with the piston rod mainly at a vehicle-side end. In such a shock absorber, when the vehicle is running on a smooth road surface, the vehicle body does not generally incline so that little load is applied to the shock absorber in its contraction and extension actions, and therefore the load applied from the piston rod to the slide surface 5 of the slide member 1 is low. However, when the vehicle is running on a bumpy road surface, the load applied to the shock absorber which contracts on a sinking side of the vehicle body becomes high due to the inclination of the vehicle body so that the piston rod is bended, and therefore the partial contact with the piston rod occurs not only in the resin slide layer 41 of the slide member 1 on the vehicle-side end but also in the resin slide layer 41 of the slide member 1 on a wheel-side end while the load applied from the piston rod to the slide surface 5 of the slide member 1 becomes high. On the other hand, even when the vehicle is running on the bumpy road surface, few load is applied to the shock absorber which extends so as to cause the vehicle body to float, and therefore the load applied from the piston rod to the slide surface 5 of the slide member 1 becomes low.

Meanwhile, the slide member 1 of the present invention contains the granular elements 7 in the resin slide layer 41. Thus, when the vehicle is running on a smooth road surface, for example, the load applied to the shock absorber in the contraction and extension actions is low, and therefore, when the load applied from the piston rod to the slide surface 5 of the resin slide layer 41 of the slide member 1 is low, the friction force between the slide surface 5 and the piston rod is suppressed to be low by the above-described characteristics of the granular elements 7. This causes the piston rod to easily slide, and therefore, the piston rod smoothly moves in and out of the cylinder, and the shock absorber easily repeats the extension and contraction actions, and easily generates damping force.

On the other hand, in the case where the load applied to the shock absorber on the contract action side is high due to the inclination of the vehicle when the vehicle is running on a bumpy road surface, for example, so that the load applied from the piston rod to the slide surface 5 of the resin slide layer 41 of the slide member 1 is high, the friction force between the resin slide layer 41 and the piston rod increases due to the characteristics of the granular elements 7. For this reason, the piston rod is difficult to slide, and the entering amount of the piston rod into the cylinder is suppressed, so that the amplitude of vibration in the contraction action becomes small, and the vehicle inclination can be made small. On the contrary, even when the vehicle is running on the bumpy road surface, the load applied to the shock absorber is low in the extension action, so that the load applied from the piston rod to the slide surface 5 of the resin slide layer 41 of the slide member 1 is low. In this case, the friction force between the resin slide layer 41 of the slide member 1 and the piston rod is suppressed to be low so that the piston rod easily slide and can easily move out of the cylinder, and therefore the extension action promptly occurs to cause the wheels in contact with the road surface. It will be understood that in the case where inclination in the axial direction of an axle occurs during the vehicle is running as described above, the piston rod on one end side in the axial direction is in the contract action while the piston rod on the other end side in the axial direction is in the extension action.

On the contrary, in the case of a slide member in which a slide surface of a resin slide layer is just formed to have low friction as in the art disclosed in JP-A-2003-247546, when the vehicle is running on a smooth road surface, for example, the load applied to a shock absorber in the contraction and extension actions is low so that the load applied to the slide surface of the resin slide layer of the slide member is low, and therefore the friction force between the resin slide layer and a piston rod is suppressed to be low. This causes the piston rod to easily slide, and therefore the piston rod smoothly moves in and out of a cylinder, so that the shock absorber easily repeats the extension and contraction actions and easily generates damping force. However, when the vehicle is running on a bumpy road surface, the load applied to the shock absorber on a contraction action side is high due to the inclination of the vehicle body, however, the friction force against the piston rod is suppressed to be low although the load applied to the slide surface of the resin slide layer of the slide member is high, so that the piston rod slides too much and deeply enters the cylinder, resulting in large tilt of the vehicle body.

Further, in the case of a slide member configured such that a slide surface of a resin slide layer is formed in a raised-recessed or concavo-convex shape as in the art disclosed in JP-B2-5354134 and thereby convex portions each having a point peak or a linear peak are provided to inhibit formation of an oil film on the slide surface to simply increase the dynamical friction force between the slide surface and a piston rod, when the vehicle is running on a smooth road surface, the piston rod does not smoothly move in and out of a cylinder and a shock absorber is difficult to repeat the extension and contraction actions, so that the ride quality of the vehicle is worsened. Moreover, in the case of this conventional slide member, the peaks of the convex portions formed on the slide surface of the slide member wears in use of the shock absorber, and the function of inhibiting the oil film is gradually lost, resulting in change of the ride quality.

Unlike an idea of improving running stability only by reducing friction on the slide surface of the resin slide layer of the slide member as in the art disclosed in JP-A-2003-247546 and an idea of improving running stability only by increasing friction on the slide surface of the resin slide layer of the slide member as in the art disclosed in JP-B2-5354134, for example, the slide member 1 of the present invention contains the granular elements 7 in the resin slide layer 41 so that the friction between the slide member 1 and the piston rod can be promptly generated depending on a road surface state in the respective extension and contraction actions of the shock absorber. This reduces the amplitude of vibration of the shock absorber on the contraction action side, and at the same time, ensures contact of the wheels with the road surface in the shock absorber on the extension action side, so that the running stability of the vehicle can be improved.

(Performance Evaluation)

Next, a reciprocal sliding test carried out by means of a reciprocal sliding testing machine using a slide member 1 will be described with reference to Tables 1 to 3.

In order to prepare slide members 1 of examples 1-9, first, compositions having compositions shown in "Resin Slide Layer Composition" of Table 1 below (at this preparation step, however, the composition of each granular element is molybdenum disulfide or tungsten disulfide which is a raw material before having the composition shown in "Composition of Granular Element") is uniformly mixed in an organic solvent to form a mixed liquor. After the formed mixed liquor is applied onto a back metal 2 on which a porous sintered metal 3 having a thickness of 0.3 mm and a porosity of 30% is formed, the mixed liquor is caused to permeate and cover pores and a surface of the porous sintered metal 3 by rolling. Subsequently, baking of PTFE and oxidation of molybdenum disulfide or tungsten disulfide are simultaneously performed in the above-described manner, and then a bi-metallic strip having predetermined dimensions is formed by rolling. The bi-metallic strip is cut into predetermined dimensions, and bending is performed such that the back metal 2 is disposed on an outer peripheral side and a resin slide layer 41 is disposed on an inner peripheral side. In this manner, a slide member 1 of a cylindrical shape (an inner diameter of 12.5 mm×an outer diameter of 14.5 mm×a width of 8 mm) is formed.

roughness thereof is a ten-point average roughness of 5 μm. Note that the composition of the granular element 7 of examples 1-9 in "Composition of Granular Element" of Table 1 is measured in the above-described manner.

Comparative example 1 corresponds to a conventional slide member of JP-A-2003-247546, and comparative example 2 corresponds to a conventional slide member of JP-B2-5354134. Comparative example 3 is a slide member having a resin slide layer formed by pre-mixing of PTFE, a molybdenum disulfide granular element and a molybdenum trioxide granular element, unlike the configuration of the present invention. In order to prepare the slide members of comparative examples 1-3, first, a composition shown in "Resin Slide Layer Composition" of Table 1 is uniformly mixed in an organic solvent to form a mixed liquor. After the formed mixed liquor is applied onto a back metal 2 on which a porous sintered metal 3 having a thickness of 0.3 mm and a porosity of 30% is formed, the mixed liquor is caused to permeate and cover pores and a surface of the porous sintered metal 3 by rolling. Subsequently, baking of PTFE is performed in the above-described manner under the same conditions as those of the examples of the invention except that the atmosphere in the furnace is replaced with inert gas ($N_2$), and then a bi-metallic strip having predetermined dimensions is formed by rolling. Next, the bi-metallic strip is cut into predetermined dimensions, and bending is performed such that the back metal is disposed on an outer peripheral side and that a resin slide layer is disposed on an inner peripheral side. In this manner, a slide member of a cylindrical shape is formed.

TABLE 1

| | Resin Slide Layer Composition (vol. %) | Composition of Granular Element (vol. %) | Surface State | Particle Size (μm) |
|---|---|---|---|---|
| Example 1 | PTFE + 5% Granular Element | MoS2 + 35% MoO3 | Smooth | 15 |
| Example 2 | PTFE + 15% Granular Element | MoS2 + 35% MoO3 | Smooth | 15 |
| Example 3 | PTFE + 30% Granular Element | MoS2 + 35% MoO3 | Smooth | 15 |
| Example 4 | PTFE + 15% Granular Element | MoS2 + 40% MoO3 | Smooth | 5 |
| Example 5 | PTFE + 15% Granular Element | MoS2 + 30% MoO3 | Smooth | 25 |
| Example 6 | PTFE + 15% Granular Element | WS2 + 35% WO3 | Smooth | 15 |
| Example 7 | PTFE + 15% Granular Element | WS2 + 50% WO3 | Smooth | 2 |
| Example 8 | PTFE + 15% Granular Element | WS2 + 20% WO3 | Smooth | 30 |
| Example 9 | PTFE + 15% Granular Element + 5% C | MoS2 + 35% MoO3 | Smooth | 15 |
| Comparative Example 1 | PTFE + 15% MoS2 | — | Smooth | 15 |
| Comparative Example 2 | PTFE + 15% MoS2 | — | Concavo-Convex | 15 |
| Comparative Example 3 | PTFE + 10% MoS2 + 5% MoO3 | — | Smooth | 15 |

In examples 1-3, 6 and 9, the average particle diameter of molybdenum disulfide or tungsten disulfide used as the raw material is 15 μm, the average particle diameter in example 4 is 5 μm, the average particle diameter in example 5 is 25 μm, the average particle diameter in example 7 is 2 μm, and the average particle diameter in example 8 is 30 μm, whereas the average particle diameter of the granular elements 7 after oxidation is approximately the same as that of the raw material. The particle diameter of the raw material is obtained by a laser diffraction method, whereas the average particle diameter of the slide member of each example is measured as described above. In example 9, the average particle diameter of carbon used as the raw material is 5 μm.

In the slide members 1 of examples 1-9, the thickness of the resin slide layer 41 on a porous sintered metal layer 31 is made 20 μm (see FIG. 1). A slide surface of the resin slide layer of examples 1-9 is made smooth, and the surface In the slide members of comparative examples 1-3, baking of PTFE is performed in the inert atmosphere ($N_2$), and therefore, molybdenum disulfide is not formed as a granular element. Note that slide surfaces of comparative examples 1 and 3 are made smooth. In particular, the surface roughness of comparative example 1 is adjusted to have a ten-point average roughness of 1 μm, and the surface roughness of comparative example 3 is 5 μm in ten-point average roughness. A slide surface of the resin slide layer of comparative example 2 is formed in a raised-recessed shape having a plurality of quadrangular pyramids, and more specifically, the distance between peaks of adjacent convex portions is 0.05 mm, and the depth thereof is 20 μm.

The thickness of the resin slide layers of comparative examples 1-3 is made 20 μm which is the same as the examples. The average particle diameter of molybdenum disulfide dispersing in the resin slide layers of comparative examples 1-3 is 15 μm, and the average particle diameter of molybdenum trioxide of comparative example 3 is 15 μm. These average particle diameters are measured in the same manner as that of the examples. Note that the slide member of comparative example 3 has such a structure that granular molybdenum disulfide and granular molybdenum trioxide separately disperse in the resin slide layer. The total content amount of molybdenum disulfide and molybdenum trioxide in the resin slide layer of comparative example 3 is the same as that of the granular elements of the resin slide layer 41 of example 2, and the volume ratio or proportion between molybdenum disulfide and molybdenum trioxide in comparative example 2 is also the same as the volume ratio or proportion between molybdenum disulfide and molybdenum trioxide in the granular element 7 of example 2.

The reciprocal sliding test performed using, as the test samples, the slide members of examples 1-9 of Table 1 and the slide members of comparative examples 1-3 by the reciprocal sliding test machine will be described with reference to Tables 1 to 3.

Table 1 shows the specifications of the slide members of the examples and the comparative examples. The column "Resin Slide Layer Composition" in Table 1 shows the compositions in vol. % of the resin slide layers of the examples and the comparative examples, and the column "Composition of Granular Element" shows the compositions in vol. % of the granular elements 7 of examples 1-9. The column "Surface State" in Table 1 shows the state of the slide surface of the resin slide layer of each of the examples and the comparative examples. Specifically, the surface roughness of the resin slide layer in examples 1-9 and comparative examples 1 and 3 is 5 μm in ten-point average roughness. Such a state is indicated as "smooth" in the column "Surface State." Note that the surface of the resin slide layer of comparative example 2 is made into the raised-recessed shape having the above-described dimensions, and this is indicated as "concavo-convex".

The reciprocal sliding test is performed using the reciprocal sliding test machine under the conditions shown in Table 2 below. Specifically, the reciprocal sliding test is performed by fitting the cylindrical slide member 1 as the test sample into a housing, reciprocally sliding, via a spring, a piston rod inserted into the slide member 1 on the slide member 1 to which shock absorber oil is applied, and measuring the force of friction with the piston rod by a load cell. Table 3 shows the test results obtained in such a manner that a load under conditions A is applied in both contraction and extension actions of the shock absorber based on the assumption of a load applied to the shock absorber when a vehicle is running on a smooth road surface. Further, Table 3 shows the test results obtained in such a manner that a load is changed, namely, a high load under conditions B is applied in the contraction action of the shock absorber whereas a low load under the conditions A is applied in the extension action of the shock absorber based on the assumption of a load applied to the shock absorber when the vehicle is running on a bumpy road surface.

TABLE 2

Reciprocal Sliding Test Conditions

| Item | Unit | Conditions A | Conditions B |
|---|---|---|---|
| Load | N | 196 | 294 |
| Sliding Speed | mm/s | 1 | |
| Stroke | mm | 2 | |
| Lubricant | — | Shock Absorber Oil | |
| The Number of Strokes | — | 100 Times | |

TABLE 3

| | Conditions A (196N) | | Conditions B (294N) | |
|---|---|---|---|---|
| | Friction Force in Contraction (N) | Friction Force in Extension (N) | Friction Force in Contraction (N) | Friction Force in Extension (N) |
| Example 1 | 15.5 | 14.8 | 29.6 | 16.7 |
| Example 2 | 16.4 | 15.5 | 31.7 | 17.3 |
| Example 3 | 16.8 | 15.7 | 32.8 | 17.9 |
| Example 4 | 16.9 | 15.6 | 30.7 | 17.5 |
| Example 5 | 16 | 15.2 | 33.1 | 17.6 |
| Example 6 | 16.6 | 15.7 | 32.2 | 17.5 |
| Example 7 | 15.9 | 16.1 | 33.6 | 18 |
| Example 8 | 15.4 | 14.9 | 29.5 | 16.7 |
| Example 9 | 16.8 | 15.3 | 32.5 | 17.6 |
| Comparative Example 1 | 14.9 | 14.3 | 17.2 | 15.8 |
| Comparative Example 2 | 25.5 | 22.4 | 34.2 | 31.6 |
| Comparative Example 3 | 22.4 | 20.1 | 32.9 | 30 |

As seen from Table 3, the following has been found from the test results of the reciprocal sliding test obtained in such a manner that the load under the conditions A is applied in both contraction and extension actions of the shock absorber based on the assumption of the load applied to the shock absorber when the vehicle is running on the smooth road surface.

In examples 1-9 where the granular elements are added to the resin slide layer 41, the friction force in the contraction action of the shock absorber is 15.4 to 16.9 N, and the friction force in the extension action of the shock absorber is 14.8 to 16.1 N. On the contrary, in comparative example 1 where the surface roughness of the resin slide layer is small, no oxidation is performed and the granular element is not formed, the friction force in the contraction action of the shock absorber is 14.9 N, and the friction force in the extension action of the shock absorber is 14.3 N. Further, in comparative example 2 where the raised-recessed shape is formed over the entire slide surface of the resin slide layer, the friction force in the contraction action of the shock absorber is 25.5 N, and the friction force in the extension action of the shock absorber is 22.4 N. In comparative example 3 where no oxidation is performed for the resin slide layer and molybdenum disulfide and molybdenum trioxide are added as the raw material, the friction force in the contraction action of the shock absorber is 22.4 N, and the friction force in the extension action of the shock absorber is 20.1 N.

As described above, in examples 1-9 where the granular elements are added to the resin slide layer 41 and in comparative example 1 where the surface roughness of the resin slide layer is small, no oxidation is performed and thus the granular element is not formed, the friction force in the contraction and extension actions of the shock absorber can be suppressed low under the conditions A. That is, in the case where a vehicle is running on a smooth road surface and the load applied to a shock absorber is low as the conditions A, the friction force between a slide surface and a piston rod is suppressed low, so that the piston rod easily slides and the piston rod smoothly moves in and out of a cylinder, and therefore the shock absorber easily repeats the extension and contraction action and easily generates damping force.

On the other hand, unlike examples 1-9 and comparative example 1, the friction force in the contraction and extension actions of the shock absorber cannot be suppressed low in comparative example 2 where the raised-recessed shape is formed over the entire slide surface of the resin slide layer 41 and in comparative example 3 where no oxidation is performed for the resin slide layer and molybdenum disulfide and molybdenum trioxide are added as the raw material. That is, even in the case where a vehicle is running on a smooth road surface and the load applied to a shock absorber is low like the conditions A, the friction force between a slide surface and a piston rod cannot be suppressed low, and therefore the piston rod is difficult to slide, and does not smoothly move in and out of a cylinder. Thus, the shock absorber is difficult to repeat the extension and contraction action, and cannot generate sufficient damping force.

Accordingly, in the case where a vehicle is running on a smooth road surface and the load applied to a shock absorber is low like the conditions A, by adding granular elements to a resin slide layer 41 like the slide members 1 of the embodiments of the present invention, it becomes possible to maintain a low friction force in the contraction and extension actions of the shock absorber so that the ride quality when the vehicle is running on the smooth road surface becomes equivalent to that of comparative example 1.

Next, the following has been found from the results of the reciprocal sliding test obtained based on the assumption of the load applied to the shock absorber when the vehicle is running on the bumpy road surface.

In examples 1-9 where the granular elements are added to the resin slide layer 41, the friction force in the contraction action of the shock absorber is 29.5 to 33.6 N, and the friction force in the extension action of the shock absorber is 16.7 to 17.9 N. On the contrary, in comparative example 1 where the surface roughness of the resin slide layer is small, no oxidation is performed and thus the granular element is not formed, the friction force in the contraction action of the shock absorber is 17.2 N, and the friction force in the extension action of the shock absorber is 15.8 N. Further, in comparative example 2 where the raised-recessed shape is formed over the entire slide surface of the resin slide layer, the friction force in the contraction action of the shock absorber is 34.2 N, and the friction force in the extension action of the shock absorber is 31.6 N. In comparative example 3 where no oxidation is performed for the resin slide layer and molybdenum disulfide and molybdenum trioxide are added as the raw material, the friction force in the contraction action of the shock absorber is 32.9 N, and the friction force in the extension action of the shock absorber is 30.0 N.

As described above, in examples 1-9 where the granular elements are added to the resin slide layer 41 and in comparative example 2 where the raised-recessed shape is formed over the entire slide surface of the resin slide layer, the friction force in the contraction action of the shock absorber can be increased as compared to comparative example 1 where the surface roughness of the resin slide layer is small and no granular element is included, and to comparative example 3 where no oxidation is performed for the resin slide layer and molybdenum disulfide and molybdenum trioxide are added as the raw material. That is, in the case where a vehicle is running on a bumpy road surface and the load applied to a shock absorber in the contraction action is high like the conditions B, the friction force between a slide surface and a piston rod increases, so that the piston rod is difficult to slide. Accordingly, the entering amount of the piston rod entering into a cylinder is suppressed, and the amplitude of vibration in the contraction action becomes small, so that vehicle inclination can be small.

In examples 1-9 where the granular elements are added to the resin slide layer 41, comparative example 1 where the surface roughness of the resin slide layer is small and no granular element is contained, and comparative example 3 where no oxidation is performed for the resin slide layer and molybdenum disulfide and molybdenum trioxide are added as the raw material, the friction force in the extension action of the shock absorber can be suppressed low. That is, since the friction force between the slide surface and the piston rod is suppressed low even when the vehicle is running on the bumpy road surface, the piston rod easily slides and easily moves out of the cylinder, and thereby the extension action promptly occurs so that the wheels can be in contact with the road surface.

Accordingly, in the case where a vehicle is running on a bumpy road surface and the load applied to a shock absorber in the contraction action is high like the conditions B, it is better to add the granular elements to the resin slide layer 41 like examples 1-9 for increasing the friction force in the contraction action of the shock absorber, as well as maintaining a low friction force in the extension action, and thereby the amplitude of vibration of the shock absorber on the contraction action side can be reduced, and the wheels are ensured to be in contact with the road surface in the shock absorber on the extension action side, so that the running stability when the vehicle is running on the bumpy road surface can be improved.

Note that in the case of forming the raised-recessed shape over the entire slide surface of the resin slide layer 41 like comparative example 2, the friction force tends to increase not only in the contraction action of the shock absorber but also in the extension action of the shock absorber. In such a case that the friction force increases in the extension action of the shock absorber, the piston rod is difficult to slide and to move out of the cylinder, the extension action does not occur promptly, the contact of the wheels with the road surface is delayed, and therefore the running stability of the vehicle becomes worsened. Further, in comparative example 2, the friction force in the contraction action tends to be decreased as the number of cycles of the reciprocal sliding test shown in Table 2 is increased to 500, or 1000, for example. It is assumed that this is because the raised-recessed portions formed over the entire slide surface of the resin slide layer wears so that the effect of inhibiting an oil film is weakened.

The invention claimed is:

1. A slide member for a shock absorber provided between a vehicle body and a wheel of a vehicle for supporting a piston rod reciprocally sliding in an axial direction in the shock absorber, comprising:
   a back metal;
   a porous sintered metal layer containing a porous sintered metal formed on the back metal and a resin with which the porous sintered metal is impregnated and covered; and
   a resin slide layer formed on the porous sintered metal layer and having a slide surface,
   wherein the slide member is formed in a cylindrical shape, and the resin slide layer is disposed on an inner peripheral side of the slide member, and
   the resin slide layer includes polytetrafluoroethylene and a plurality of granular elements dispersed in the polytetrafluoroethylene, and wherein
   each granular element includes two-dimensional crystal layers of molybdenum disulfide and at least one two-dimensional crystal layer of molybdenum trioxide, the two-dimensional crystal layers of molybdenum disulfide and the at least one two-dimensional crystal layer of molybdenum trioxide form a multilayered structure, and one of the at least one two-dimensional crystal layer of molybdenum trioxide is disposed between two of the two-dimensional crystal layers of molybdenum disulfide.

2. The slide member according to claim 1, wherein a surface roughness of the slide surface of the resin slide layer is equal to or less than 5 μm in ten-point average roughness (Rz).

3. The slide member according to claim 1, wherein an average particle diameter of the plurality of granular elements is 5 to 25 μm, and a content amount of each granular element in the resin slide layer is 5 to 30 vol. %.

4. The slide member according to claim 1, wherein a content amount of the molybdenum trioxide in each granular element is 20 to 50 vol. %.

5. The slide member according to claim 1, wherein the resin slide layer further contains carbon and/or graphite of 5 vol. % or less in total.

6. The slide member according to claim 1, wherein the slide surface has a ten-point average roughness (Rz) of equal to or less than 15 μm.

7. The slide member according to claim 1, wherein the granular elements are obtained by oxidizing powder of molybdenum disulfide while maintaining a layered structure of the two-dimensional crystals layers of molybdenum disulfide.

8. A slide member for a shock absorber provided between a vehicle body and a wheel of a vehicle for supporting a piston rod reciprocally sliding in an axial direction in the shock absorber, comprising:
   a back metal;
   a porous sintered metal layer containing a porous sintered metal formed on the back metal and a resin with which the porous sintered metal is impregnated and covered; and
   a resin slide layer formed on the porous sintered metal layer and having a slide surface,
   wherein the slide member is formed in a cylindrical shape, and the resin slide layer is disposed on an inner peripheral side of the slide member, and
   the resin slide layer includes polytetrafluoroethylene and a plurality of granular elements dispersed in the polytetrafluoroethylene, and each granular element includes two-dimensional crystal layers of tungsten disulfide and at least one two-dimensional crystal layer of tungsten trioxide, the two-dimensional crystal layers of tungsten disulfide and the at least one two-dimensional crystal layer of tungsten trioxide form a multilayered structure, and one of the at least one two-dimensional crystal layer of tungsten trioxide is disposed between two of the two-dimensional crystal layers of tungsten disulfide.

9. The slide member according to claim 8, wherein a surface roughness of the slide surface of the resin slide layer is equal to or less than 5 μm in ten-point average roughness (Rz).

10. The slide member according to claim 8, wherein an average particle diameter of the plurality of granular elements is 5 to 25 μm, and a content amount of each granular element in the resin slide layer is 5 to 30 vol. %.

11. The slide member according to claim 8, wherein a content amount of the tungsten trioxide in each granular element is 20 to 50 vol. %.

12. The slide member according to claim 8, wherein the resin slide layer further contains carbon and/or graphite of 5 vol. % or less in total.

13. The slide member according to claim 8, wherein the slide surface has a ten-point average roughness (Rz) of equal to or less than 15 μm.

14. The slide member according to claim 8, wherein the granular elements are obtained by oxidizing powder of tungsten disulfide while maintaining a layered structure of the two-dimensional crystals layers of tungsten disulfide.

* * * * *